No. 663,402. Patented Dec. 4, 1900.
H. K. SMITH, W. W. MORTON & R. L. GIBSON.
SPRING MOTOR.
(Application filed Mar. 7, 1900.)
(No Model.) 2 Sheets—Sheet 1.

Witnesses: Inventors
Henry K. Smith
Wm. W. Morton and
Robt. L. Gibson
By their atty No. 663,402. Patented Dec. 4, 1900.
H. K. SMITH, W. W. MORTON & R. L. GIBSON.
SPRING MOTOR.
(Application filed Mar. 7, 1900.)
(No Model.) 2 Sheets—Sheet 2.
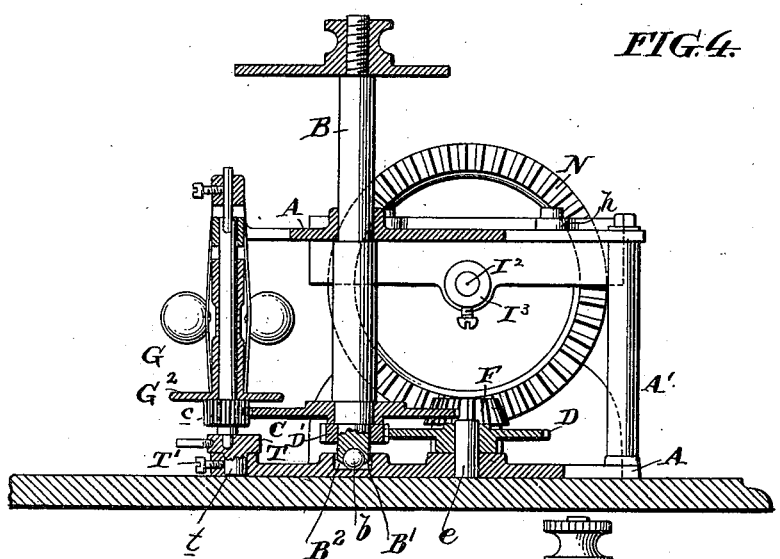
FIG. 4.
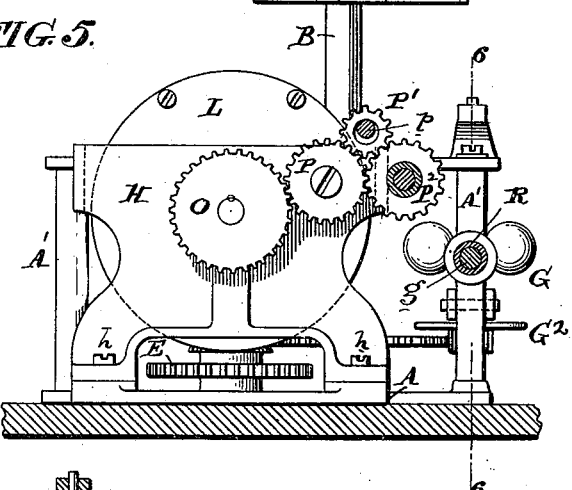
FIG. 5.
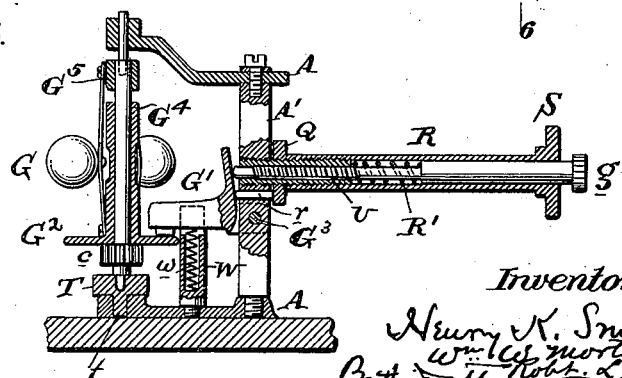
FIG. 6.
Witnesses: Inventors:
THE NORRIS PETERS CO., PHOTO-LITHO., WASHINGTON, D. C.

UNITED STATES PATENT OFFICE.

HENRY K. SMITH, OF PHILADELPHIA, PENNSYLVANIA, WILLIAM W. MORTON, OF CAMDEN, NEW JERSEY, AND ROBERT L. GIBSON, OF PHILADELPHIA, PENNSYLVANIA; SAID SMITH AND MORTON ASSIGNORS TO SAID GIBSON.

SPRING-MOTOR.

SPECIFICATION forming part of Letters Patent No. 663,402, dated December 4, 1900.

Application filed March 7, 1900. Serial No. 7,667. (No model.)

*To all whom it may concern:*

Be it known that we, HENRY K. SMITH, of the city and county of Philadelphia, in the State of Pennsylvania, WILLIAM W. MORTON, of Camden, county of Camden, State of New Jersey, and ROBERT L. GIBSON, of the city and county of Philadelphia, in the State of Pennsylvania, have invented an Improvement in Spring-Motors, of which the following is a specification.

Our invention has reference to spring-motors; and it consists of certain improvements set forth in the following specification and shown in the accompanying drawings, which form a part thereof.

The object of our invention is to provide a simple construction of spring-motor especially adapted for mechanical reproducing or speaking machines and other devices wherein a small power and uniform and continued rotation of the driving-spindle is required.

Our invention comprehends certain features of construction which will be better understood by reference to the accompanying drawings, in which—

Figure 1:
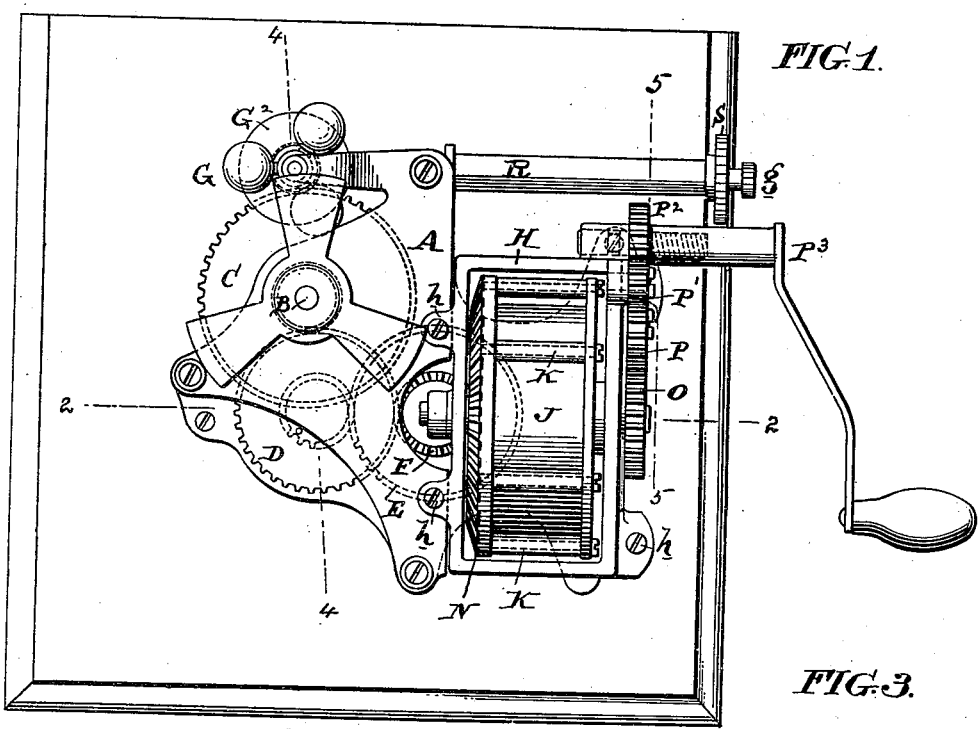
Figures 2, 3:
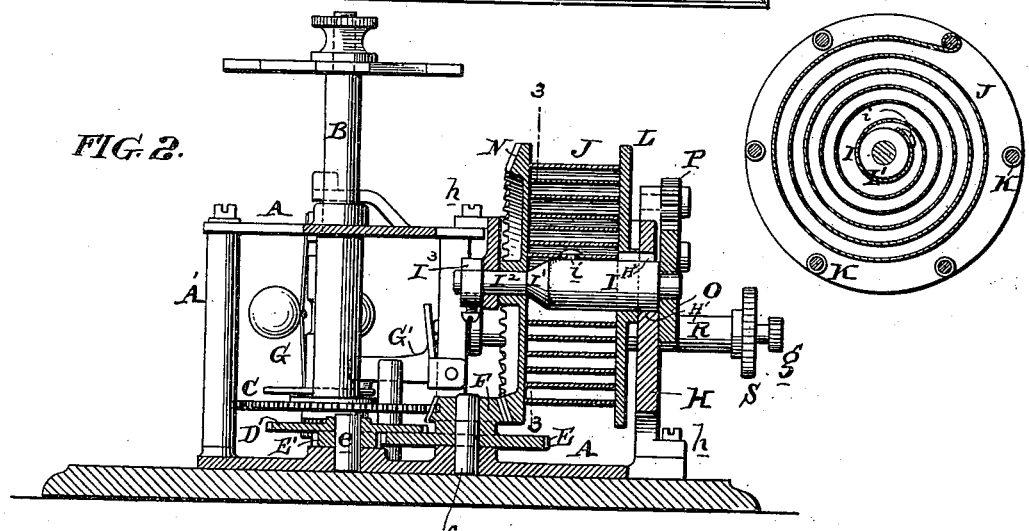

Figure 1 is a plan view of our improved machine. Fig. 2 is a sectional elevation on the line 2 2 of Fig. 1. Fig. 3 is a sectional elevation of the spring and cage on line 3 3 of Fig. 2. Fig. 4 is a sectional elevation of the motor on line 4 4 of Fig. 1. Fig. 5 is a sectional elevation of same on line 5 5 of Fig. 1, and Fig. 6 is a sectional elevation of the governor-controlling and brake devices on line 6 6 of Fig. 5.

A is the main frame of the machine and may be made in any suitable manner, preferably by top and bottom plates connected by uprights A'.

B is the upright driven shaft and, when used in connection with a speaking instrument, operates the usual horizontal supporting-disk, upon which the record-disk is clamped. This shaft B is geared to a suitable governor G by means of gearing comprising a large spur-wheel C, secured to the shaft B, meshing with a pinion C on the governor-spindle. A bevel-pinion F is secured to a gear E and journaled upon a stud $f$ in the base of the main frame A. The spur-gear E meshes with a pinion E', journaled upon a second stud $e$, also projecting upward from the base of the main frame A. Secured to the pinion E' is a larger spur-wheel D, which meshes with a pinion D' on the driven shaft B. By means of these several sets of gears a slow rotation of the bevel-pinion produces a rapid rotation of the driven shaft B. Any other suitable form of intermediate gearing may be employed between the bevel-pinion F and the shaft B.

N is a large bevel-gear arranged to rotate in a vertical plane and meshes with the pinion F. This gear N acts as one head of a cage structure, which also includes a second head L and connecting-balls and spacing-tubes K. The cage thus formed is loosely sleeved upon a winding-shaft I. A coil-spring J has its outer end connected to one of the studs K and its inner end connected to the shaft I by a headed pin $i$. This winding-shaft I is journaled in a box-shaped frame H, which has an inner and upper part adapted to be attached by screws at $h$ to the upper portions of the main frame A and an outer and lower part adapted to be connected by screws $h$ with the base of the main frame A. The pin $i$ is hooked into the inner end of the coil-spring J, and the shaft I is hereby held against longitudinal movement in the box-frame H.

The winding-shaft I has its body tapered at I' to the diameter of the small bearing part I², so that this end may be quickly and easily thrust into the central tight coil of the spring. It represents no abrupt shoulders to catch upon the spring. A collar I³ locks the shaft I in position within the frame H.

When the frame H is bolted in position, the gears N and F will be in proper meshing condition, as shown in Fig. 2. When it is desired to remove the spring and its connections for repairs, the frame H may be readily disconnected from the main frame A by simply removing the screws $h$. It is then in condition for being easily handled.

The bearing H' of the box-frame H is formed with a lateral slot H² sufficient in size to permit the passage of the headed pin $i$ on the shaft I to permit assembling by inserting the shaft from the outer side.

The shaft I upon the outer side of the box-frame H is secured to a gear O, which receives motion from a pinion P, which in turn is driven by a pinion P², the latter having provision for connection with a suitable crank P³ (shown in Fig. 1) for winding up the spring. The gears P and P² are locked in position by an idler locking-pinion P', loose upon its support $p$ and adapted to act as a lock by simultaneously meshing with both the pinions P and P². This permits ready winding up of the spring, but locks the shaft or arbor I from turning backward. Any other suitable device may be employed in lieu of that shown.

By the construction herein set out it is evident that the winding action operates upon the central shaft I to wind up the spring to secure the necessary tension, and the outer end of the spring which connects with one of the studs or bolts K operates to impart motion to the bevel-gear N. It is evident from this that the spring may be wound up while the motor is operating the driven shaft B, and this is especially useful where a continued movement is required and where there is liability of the spring running down before the completion of the operation.

In a motor of this character it is essential that a minimum friction on the driven shaft be allowed in the bearings or step. To secure this result in an efficient and inexpensive manner, we provide the base of the main frame A with a socket-bearing B², into which the end of the shaft B is stepped. The lower end of this shaft is recessed and fitted with a hardened-steel ball, which is held in place by the lower edges of the shaft being upset over the sides of the ball, as shown in Fig. 4. In this manner we secure a fine bearing which is cheap to construct, durable, and adjustable.

The governor may be controlled to adjust the speed of the motor by a suitable friction-lever G', which presses upon a rotating flange G² of the governor. This friction-lever G' is hinged at G³ to the post A' of the main frame and held against lateral displacement by a slotted tubular post W, extending upward from the main frame. A spring $w$ in said tubular post removes the pressure of the lever G' from the governor. A screw-threaded bushing V is fitted to the post A', and in this a screw-threaded adjusting-rod passes for operation upon the brake-lever G' to regulate the speed of the governor. A spring R', acting on the rod $g$, prevents loose motion and tends to hold it in its adjusted position by increasing the friction in its threaded portion. Surrounding the adjusting-rod $g$ and screwed upon the outside of the bushing V is a tubular shaft R, having at its outer or free end a milled head S, by which it is adjusted.

The inner end of the tube R presses upon a loose collar Q, which in turn acts upon the loose pin $r$, extending through the post A' and acting upon the brake-lever G'. By rotating the tubular shaft R it is screwed upon the bushing and presses the collar P against the pin $r$, pushing it against the lever G', so as to force its friction-shoe upon the flange G² of the governor with sufficient force to positively arrest its rotation and stop the motor. Upon removing the pressure by throwing off the brake the brake-lever G' is again received by the end of the adjusting-shaft $g$, and the motor once more operates at its normal and predetermined speed.

As the teeth of the gears C $c$ are exceedingly fine, it is important to provide a proper adjustment relatively between them. To do this, we form the lower bearing of the governor in a block T, having a bearing $t$ in the main frame, relatively to which the bearing of the governor is eccentric. By turning the block T the pinion $c$ of the governor is moved to or from the spur C, and when the proper adjustment is secured the bearing may be locked by the set-screws T', Fig. 4.

Another feature of importance in the governor is that the sleeve G⁴, carrying the disk G², is extended up sufficiently close to the top hub G⁵ on the spindle to act as a stop and prevent abnormal spreading of the springs and weights in case of breakage or bad adjustment of the lever G or its controlling devices.

By making the frame H removable, together with the winding-shaft I and the large bevel-gear N, we are enabled to disconnect these parts from the remaining portion of the machine for purpose of repair or cleaning without dismantling the remaining or speed increasing and governing portions of the motor, which is an important feature in machines of this class where repairs have to be quickly performed. Furthermore, by disconnecting the frame H with its gear N it will be seen that the gear F may readily be removed from its stud, together with the other gears E E' and D, by subsequently loosening the collar $b$ of the driven shaft B. It is therefore seen that the various parts of the motor may be readily dismantled and free access be secured to them by the primary removal of the frame H and its appendages. This motor may be employed for operating both disk and cylinder records in talking instruments, as desired, and, in fact, may be used for any purpose when continued and uniform motion is required.

While we prefer the construction shown, we do not limit ourselves to the minor details, as they may be varied without departing from the principles of the invention.

Having now described our invention, what we claim as new, and desire to secure by Letters Patent, is—

1. In a spring-motor, the combination of the main frame, a driven shaft therein, a bevel-pinion working upon a vertical stud carried on the main frame, a connecting-train of gearing between the bevel-pinion and driven shaft, a vertically-arranged cage having a large bevel-gear meshing with a bevel-pinion on the main frame, a spring arranged within the cage having its outer end attached to the periphery of the cage and its inner end attached to a shaft upon which the cage freely revolves, means for winding the shaft to which the spring is attached and locking it against backward motion, and an independent frame carrying the said cage and detachably secured to the main frame whereby the large bevel-gear of the cage may be held in proper relation for holding the bevel-pinion and the connecting-train of gearing in operative position upon its vertical stud.

2. In a spring-motor, the combination of the main frame, a driven shaft therein, a bevel-pinion, a connecting-train of gearing between the bevel-pinion and the driven shaft, a vertically-arranged cage having a large bevel-gear meshing with the bevel-pinion on the main frame, a spring arranged within the cage having its outer end attached to the periphery of the cage and its inner end attached to a shaft upon which the cage freely revolves, means for winding the shaft to which the spring is attached and locking it against backward motion, and a removable box-frame carrying the cage, the spring and the winding-shaft and detachably connected with the main frame, whereby the spring and its immediate connections may be supported by the box-frame in permanent operative relation to each other and by said frame be readily disconnected from and without dismantling the remaining part of the motor.

3. In a power-motor, a driven shaft and a train of gearing for operating said shaft leading to and connecting with a bevel-pinion, in combination with a large driven bevel-gear, a winding-gear connected to the inner end of the spring, means to hold the winding-shaft against backward rotation, and a removable frame carrying the spring, the winding-shaft and the large bevel-gear made detachable from the remaining part of the motor, whereby the spring and its immediate connections may be supported by the box-frame in permanent operative relation to each other and by said frame be removed without dismantling the remaining part of the machine.

4. In a motor, the combination of the driven shaft, power devices for driving the shaft, a friction-disk geared with the driven shaft, a brake-lever adapted to control the rotation of the disk, a screw-threaded rod carried by the frame of the motor for adjusting the brake-lever for speed regulation, and a tubular shaft encircling the rod and screwed upon the main frame and also operating upon the brake-lever whereby a positive pressure may be applied to arrest the rotation of the friction-disk but when removed the normal speed will be at once secured.

5. In a power-motor, the combination of the main frame carrying the driven shaft and speed-multiplying gearing for driving it, with a removable rigid frame structure detachably secured to the main frame, a driving-gear journaled in and carried wholly by the removable frame for driving the speed-multiplying gearing of the main frame, a coil-spring having its outer end connected to the driven gear, a central shaft connected to the inner end of the spring and journaled in the removable frame, and means also carried by and detachable with the removable frame for rotating the central shaft and locking it against backward rotation whereby the coil-spring, the driven gear, the central shaft and the means for rotating and locking the shaft are supported by the removable rigid frame structure in permanent operative relation to each other and by said frame be readily disconnected as a unit from the main frame and the speed-multiplying gearing.

6. In a power-motor, the combination of the main frame carrying the driven shaft and speed-multiplying gearing for driving it, with removable frame detachably secured to the main frame, a coil-spring having its outer end connected to the driven gear, a central shaft connected to the inner end of the spring and journaled in the removable frame, means also carried by the removable frame for rotating the central shaft and locking it against backward rotation, a governor on the main frame for controlling the speed of rotation of the driven shaft, and means for regulating the speed of the governor carried by the main frame independently of the removable frame.

7. In a power-motor, the combination of the driven shaft, gearing for rotating it, a spring for rotating the gearing, a friction-disk for regulating the speed of rotation of the driven shaft, a friction-lever G' for controlling the rotation of the disk, a bushing U screw-threaded both internally and externally, a screw-threaded shaft $g$ extended through the bushing for adjusting the lever G' to regulate the speed of the disk, and a tubular shaft R screwed upon the outside of the bushing and acting upon the lever G' for stopping the disk and performing the function of a brake.

8. In a motor, the combination of a spring cage or case having a large bearing at one side and a small bearing at the opposite side, a coil-spring arranged within the case and having its outer end attached thereto, and a winding arbor or shaft furnished with a headed pin and having its body and one end of large diameter and the other end of small diameter and connected with the part of large diameter by a tapering or conical portion, whereby the said shaft or arbor may be forced through the small central coil of the spring within the case and be simultaneously journaled in the bearings thereof.

9. In a motor, the driven shaft, spring and connecting-gearing, in combination with a winding shaft or arbor for winding the spring, a crank or hand shaft for winding the arbor, a train of spur-gearing between the crank or hand shaft and the winding shaft or arbor, and a locking-gear adapted to mesh simultaneously with two of said gears of the train of gears and supported loosely whereby it may roll out of mesh with either or both of two of said gears or into mesh with both of them to lock the arbor or winding-shaft against backward motion.

10. In a spring-motor, the combination of the spring and its arbor, a winding-shaft, a connecting train of gears between the winding shaft and arbor, and a locking device to arrest the rotation of the train of gears and arbor in one direction only consisting of a gear adapted to mesh simultaneously with one of the gears of the said train of gears and supported loosely whereby it may roll out of mesh with either or both of two of said gears or into mesh with both of them.

11. In a spring-motor, the combination of an upright driven shaft, a train of gears to rotate it at high speed, a spring power device to drive the train of gears, and a bearing for the end of the rapidly-moving driven shaft consisting of a hardened-steel ball fitted into the end of the shaft and held thereto by overextending parts which contract the opening through which the ball is exposed, whereby the lower end of the shaft presents a smooth true hardened-steel bearing.

12. In a motor, a driven shaft, a speed-controlling shaft parallel to the driven shaft, spur-gearing between the driven shaft and speed-controlling shaft, a fixed bearing for one end of the controlling-shaft, a friction device for controlling the speed of rotation of the controlling-shaft, and an adjustable bearing for the other end of the controlling-shaft consisting of a pivoted block having the spindle of the controlling-shaft journaled therein eccentric to its pivot and means to lock the block in its adjusted positions to enable the spur-gearing to be adjusted to compensate for wear and prevent noise.

13. In a motor, the combination of a driven shaft, power devices for driving it, a friction-disk geared with the driven shaft, a pivoted brake-lever G' adapted to control the rotation of the disk, a slotted tubular post W to hold the brake-lever against lateral motion, a spring $w$ to press the brake-lever away from the disk, and hand devices for adjusting the brake-lever against the action of the spring.

In testimony of which invention we have hereunto set our hands.

HENRY K. SMITH.
WM. W. MORTON.
ROBERT L. GIBSON.

Witnesses:
J. W. KENWORTHY,
R. M. KELLY.